United States Patent [19]

Mandel et al.

[11] Patent Number: 4,865,761

[45] Date of Patent: Sep. 12, 1989

[54] COMPOSITIONS AND METHOD FOR CONTROL AND CLEAN-UP OF HAZARDOUS ACIDIC SPILLS

[75] Inventors: Frederick S. Mandel; James A. Engman, both of Marinette; Wayne R. Whiting, Oconto, all of Wis.; James Nicol, Plano, Tex.

[73] Assignee: Wormald, U.S. Inc., Dallas, Tex.

[21] Appl. No.: 190,526

[22] Filed: May 5, 1988

Related U.S. Application Data

[63] Continuation-in-part of Ser. No. 29,847, Mar. 31, 1987, abandoned, which is a continuation-in-part of Ser. No. 859,532, May 2, 1986, abandoned.

[51] Int. Cl.$^4$ .................. C09K 3/00; C09K 21/00; A62C 35/00; A62C 13/24

[52] U.S. Cl. .................. 252/190; 252/192; 252/628; 252/8; 106/76; 106/89; 106/97; 106/98; 169/44; 169/9; 169/71; 169/73; 210/663; 210/681; 210/751

[58] Field of Search .............. 252/2, 8, 3, 4, 192, 252/190, 628, 631; 106/74, 76, 78, 89, 97, 98, DIG. 2, DIG. 4; 210/681, 682, 751; 169/44, 45, 46, 47, 9, 71, 73

[56] References Cited

U.S. PATENT DOCUMENTS

| | | | |
|---|---|---|---|
| 3,090,749 | 4/1963 | Warnock | 252/2 |
| 3,196,106 | 7/1965 | Haden, Jr. et al. | 252/628 |
| 3,837,872 | 9/1974 | Conner | 106/74 |
| 3,980,558 | 9/1976 | Thompson | 61/35 |
| 3,994,821 | 11/1976 | Seidenberger | 252/192 |
| 4,095,988 | 6/1978 | Jancek et al. | 106/97 |
| 4,207,116 | 6/1980 | Been et al. | 106/97 |
| 4,210,460 | 7/1980 | Seidenberger | 134/7 |
| 4,234,432 | 11/1980 | Tarpley, Jr. | 252/8 |
| 4,249,949 | 2/1981 | Wooler et al. | 106/90 |
| 4,297,304 | 10/1981 | Scheffler et al. | 264/0.5 |
| 4,299,722 | 11/1981 | Stock et al. | 252/628 |
| 4,518,508 | 5/1985 | Conner | 210/751 |
| 4,524,835 | 6/1985 | Mingrone | 169/65 |
| 4,547,290 | 10/1985 | Pichat | 210/751 |

OTHER PUBLICATIONS

Hackh's Chemical Dictionary–4th Edition, McGraw Hill Book Company, New York, p. 703.

Primary Examiner—Howard J. Locker
Attorney, Agent, or Firm—Morgan & Finnegan

[57] ABSTRACT

This invention relates to novel composition and methods for neutralization and solidification of hazardous acidic spills. A dry particulate composition of varying reaction grades of alkaline compounds and varying grades of absorptive materials may be used to neutralize and solidify acidic spills, solidify the spills and render them harmless. These compositions may be applied to the spills by fire-extinguisher-like delivery devices which spread the compositions on the spills from a relatively safe distance without splattering the hazardous material.

8 Claims, No Drawings

COMPOSITIONS AND METHOD FOR CONTROL AND CLEAN-UP OF HAZARDOUS ACIDIC SPILLS

This is a continuation-in-part application of U.S. Ser. No. 029,847, filed Mar. 31, 1987, which is in turn a continuation-in-part application of U.S. Ser. No. 859,532, filed May 2, 1986, now abandoned and which are hereby incorporated herein by reference.

BACKGROUND OF THE INVENTION

2. Field of the Invention

This invention relates to novel compositions and the novel methods of their use for neutralization and clean-up of hazardous acidic spills.

2. Prior Art

Various compositions have been known in the past to be useful for the clean-up of hazardous organic waste materials. Some prior art references describe methods for neutralizing acid spills. Several references describe compositions for neutralizing and solidifying liquid wastes, particularly raw sewage. However, these prior art compositions and methods for acid waste neutralization entail certain disadvantages.

U.S. Pat. No. 3,994,821 (Seidenberger) relates to the control and clean-up of a mineral acid spill using a granular composition containing 36.5 to 47.5% by weight ground marble chips, about 35 to 45.5% by weight granular soda, about 16.5 to 21.5% by weight granular magnesia and about 0.008 to 0.012% by weight of an appropriate normally solid pH indicator. Ground marble chips are composed of calcium carbonate. The granular spill control composition of this patent is employed to control and clean-up substantially all of a spilled mineral acid by applying the granular composition to this spill surface from the perimeter of the spill inward in a quantity sufficient to absorb all the spilled acid. Although the spill is generally neutralized by this granular composition, the acids having a high heat of neutralization may not be completely neutralized, thus continuing to pose a threat. Further, the method of applying this composition necessitates workers' exposure to the spill.

U.S. Pat. No. 4,210,460 (Seidenberger) relates to a composition for controlling and clean-up of a spill of hydrofluoric acid. The composition may be in one of two forms: an aqueous solution and a powdered composition. The aqueous solution is composed of about 20 to 29% by weight of calcium acetate and about 71-65% by weight of water. The powdered composition is composed of about 99.90 to 99.99% by weight powdered magnesia and about 0.01 to 0.1% by weight of an appropriate normally solid pH indicator. The powdered magnesium oxide composition can be sprinkled onto the hydrofluoric acid spill. The pH indicator will indicate by color change when an essentially safe pH condition has been reached. This composition also has the disadvantages of less-than total neutralization and the risk of exposure to the spill.

U.S. Pat. No. 4,207,116 (Been et al.) described a granulated absorbent material composed of cement, an inorganic water-absorbing swelling agent, sand or ground stone, water and, optionally, dye stuffs and other additives. The composition is mixed to form a paste, the paste is allowed to harden and the hardened material dried and granulated. The cement hardens with the water and acts as a skeleton-forming substance which provides the granulated material with hardness. The sand or ground stone acts as an inert blending agent to lower the cost price of the granulated material. The water-absorbing swelling agent, which can be a clay, aids in absorbing liquids such as water, oil and for absorbing smells. All types of clays may be used as inorganic swelling agents such as sepiolite, montmorillonite, kaolins, diatomaceous earth and bentonite. This composition is contemplated for use in cat litter, rather than in containing, neutralizing and solidifying hazardous acid spills.

U.S. Pat. No. 3,980,558 (Thompson) relates to a method for disposing of liquid or semi-liquid waste containing soluble toxic materials containing the waste and a solidifying agent which consists of a hydraulic cement which will set upon standing to a contiguous rock-like solid consistency. This prevents the waste from leaching. The term "hydraulic cement" refers to all mixtures of lime, silica, and alumina, or of lime and magnesia, silica, alumina and iron oxide and other like mixtures of ingredients. A particularly preferred mixture is Type I Portland Cement. The patent states that the process of this invention is particularly useful in disposing of aqueous sludge waste from chemical processes for the manufacture of phosphoric acids, particularly aqueous filter and sludges, which normally contain high levels of arsenic and dissolved arsenic compounds, as well as hydrogen sulfide and other sulphur compounds. Although this composition contains and solidifies waste, it is not essentially a neutralizing composition. Further, it requires solidification by mixing with the waste materials. This is impractical where there has been a spill, which does not lend itself to mixing.

U.S. Pat. No. 4,518,508 (Conner) describes a method for treating aqueous liquid and semi-liquid wastes by solidification. The method of the invention described requires that a dry water-reactive solidification agent comprising cement, a dry water absorbent material and a powdered alkali metal silicate, sufficient to convert the mixture into a consolidated chemically and physically stable solid product, are added to aqueous liquid or semi-liquid waste. The waste can then be solidified and set, forming a synthetic rock-like material. This composition acts to neutralize the acidity of the waste in part. However, it may not render complete neutralization. Another disadvantage is that it must be mixed with the waste.

U.S. Pat. No. 4,547,290 (Pichat) describes a process for solidifying strongly acid or alkaline liquid waste. According to this patent, clays can be used directly in a very acidic or strongly alkaline aqueous waste to make it possible to transform this waste into stable solid materials. According to the invention, a clay material is dispersed in the waste by stirring, and the waste neutralized. A hydraulic and/or calcium binder addition then follows. All types of fresh or dried clays can be used, such as pure clays, mixtures including attapulgites and metal carbonates. During the neutralization process lime, ground limestone, calcium carbonate base wastes, calcium silicate and/or aluminates may be added, particularly to acidic wastes. The third stage of the process causes the material to be capable of solidification. Materials such as Portland cement may be added to the pasty mass that has been formed. Again, this composition must be mixed to form a slurry in order to neutralize and solidify the waste, necessitating close contact with the waste. This method is therefore impractical when applied to acid spills.

U.S. Pat. No 3,837,872 (Conner) describes an aqueous solution of an alkaline metal silicate mixed with waste material and a silicate setting agent which causes the silicate and waste material to react with each other. This invention relates particularly to the treatment of raw human waste. According to the invention, wastes are mixed with an alkaline metal silicate such as sodium silicate which, in the presence of a silicate setting agent, causes the mixture to undergo consolidation and solidification. The setting agents include acids or acidic materials which cause gelation of the silicate. Setting agents include Portland cement, lime, gypsum and calcium carbonate and aluminum, iron, magnesium, nickel, chromium, manganese or copper compounds. This method also has the disadvantage of requiring close contact with wastes for solidification as well as actual mixing. This method cannot be used for spill control.

U.S. Pat. No. 4,297,304 (Scheffler et al.) describes a method for solidifying high and medium radioactivity and/or actinide-containing aqueous waste concentrates for fine-grained solid wastes suspended in water for final noncontaminating storage. The waste concentrates or suspensions are set by evaporation to form an evaporate having a water content in the range between 40 and 80 percent by weight and a solid content with a metal iron and/or metal oxide component between 10 and 30 percent by weight of the evaporate. The clay-like substances include silica, alumina and portland cement. The metal oxides can include MgO. The pH of the evaporate is then set to between 5 and 10, and kneaded with a clay-like substance containing a small quantity of cement or a mixture of clay-like substance with a small quantity of cement containing an additive for suppressing the volatility of alkalis. Molded bodies are produced from the kneaded mass, heat treated, calcined and fired. The bodies are then enclosed on all sides in a dense, continuous ceramic or metallic matrix. This method is not advantageous for use with acid spills: the composition must be mixed with the waste for solidification.

Thus, prior art methods have several disadvantages when applied to hazardous acidic spills. A composition which can neutralize several types of acids, which can be applied from a safe distance without danger to the workers is not suggested in the prior art.

SUMMARY OF THE INVENTION

This invention is directed to novel compositions and methods of using the compositions to neutralize and solidify hazardous organic spills so s to substantially prevent the spread of such a spill during neutralization and solidification. The compositions and methods of this invention can be applied from a safe distance and limit the rate of neutralization. Thus allowing substantially all of the spill to be reacted and neutralized.

The novel compositions of this invention contain the following: about 0 to 80% alkaline earth oxide, about 0 to 30% alkali metal carbonate, about 0 to 10% highly absorptive silica or clay, about 5 to 30% less absorptive clay, about 0.5 to 2% hydrophobic lubricant, and about 10 to 50% portland cement.

The alkaline earth oxides which may be used in the compositions of this invention conclude, e.g., magnesium oxide and calcium oxide. These components serve as neutralizing agents for the hazardous acidic spills to be treated.

Portland cement is a form of magnesium oxide which is violently reactive and serves to neutralize acidic components in hazardous acidic spills. It can, for example, neutralize less reactive acids.

The alkali metal carbonate compounds used in the compositions of this invention also act as neutralizing agents. Preferably, potassium carbonate or sodium carbonate are used. These compounds also function as solubilizing agents to maintain solubility of the neutralizing bases. Bicarbonates and sesquicarbonates may also be used in the composition for these purposes.

Highly absorptive silicas or clays having an absorbency of greater than 100% by weight of water such as calcium silicate are used in the compositions of this invention as fibrous absorption agents. Calcium silicate absorbs a tremendous amount of liquid in relation to its weight. Silicas and clays may also be used as absorption agents. These absorption agents aid the neutralization reaction by absorbing some of the less acidic materials during neutralization. The absorption of the water of neutralization drive the neutralization reaction to completion. Therefore, substantially all of the acid will be neutralized and solidified rather than only the most reactive acids.

Another absorptive clay with an absorbancy of less than 100% by weight of water and having a slower rate of absorption than the calcium silicate group, such as attapulgus clay, is also preferably used in the compositions of this invention. Fullers earth and perlite are other examples of less absorptive clays.

The absorbency of the silicas and clays is determined as follows. About 20ml of distilled water is added to 10g of the dry solid material in a beaker. The mixture is allowed to stand for 30 minutes and free unabsorbed water is removed by filtration. The amount of water absorbed by the clay is analyzed by thermogravimetric analysis.

By varying the rates of absorption as a result of the different clays present in the composition, the rate of neutralization of the unabsorbed acids may be increased. As the more reactive acids are neutralized and the products absorbed, the less reactive acids will desorb and react with remaining base. This allows the neutralization reaction to be constantly driven to completion without reaching equilibrium. This is due to the varying availabilities of reactants.

A small amount of a hydrophobic lubricating agent such as magnesium stearate, sodium or aluminum stearates, tricalcium phosphate, octoates and the like may be added to the compositions to aid in making the particulates of this composition free-flowing. The lubricating agent acts as a lubricant by imparting hydrophobicity to the particles and preventing them from sticking together.

The compositions of this invention contain several reactivity grades of alkaline materials, e.g. magnesium oxide. This allows a controlled and complete neutralization reaction. This allows the compositions of this invention to be used to neutralize a large number of acids, each of which may have a different energy requirement for neutralization. Using the compositions of this invention, more reactive acids will be neutralized quickly, thus generating a heat of neutralization which may, in turn, encourage the neutralization of less reactive materials. The presence of varying reactivity grades of magnesium oxides allows this to occur gradually.

An example of a preferred composition according to this invention is the following: 73.79% MgO, 5% $Na_2CO_3$, 10% CaO, 5.5% attapulgus clay, 5.12% calcium silicate, and 0.5% magnesium stearate. 45.25 pounds of this formula can neutralize 2.95 gallons of sulfuric acid and elevate the pH to 7.30. It can also neutralize hydrochloric, nitric phosphoric, perchloric, acetic and hydrofluoric acids, inter alia.

The compositions of this invention are preferably applied to the hazardous spills from a fire-extinguisher-like vessel. They are preferably applied in the dry form in which they are stored. They may be stored under pressure in a stored vessel until used and/or pressurized by external gas through an external expellent gas cartridge.

The size distribution of the particles of the compositions of this invention allows them to be applied to spills in a "soft" pattern in a collimated directable steam, i.e. relatively spread out such that they cover a spill as it spreads without splattering the still and endangering handlers. The compositions should be applied from a distance of about 10 to 15 feet. The nozzle velocity should be between about 30 and 50 feet/second. In order to achieve this velocity, the particles should have a size distribution between about −40 and +200 Tyler screen mesh size.

The particulate compositions of this invention may be applied on a nitrogen gas stream. The particular specified size distribution will substantially assure the appropriate flow rate and delivery pattern.

The mode of application of the method of this invention allows the control and neutralization of hazardous spills from a distance without causing splashing of the hazardous materials during neutralization.

The following examples are provided to illustrate the invention, and are not to be used to limit the scope of the invention.

EXAMPLES

The following formulations were made and tested to determine their suitability in the process of this invention in the following manner. Approximately two gallons (gal.) of acid were mixed with about 26–30 pounds (lb) of the formulation. The formulation/acid mixture was then mixed and allowed to proceed through the neutralization reaction. Ten grams of the mixture was then diluted with 100 ml. deionized water. The pH was measured.

Formulations A–R set forth below were tested in this manner. Formulations A–R are described according to the weight percentage of each element. The term 20×100 indicates that particle size distribution of MgO, as does "Fine Grade-100". The term "attaclay" indicates attapulgus clay. Silanox is a silicone-containing material available from Cabot Co., Boston, Mass.

The results of the testi"g are set forth in Table I. Table I indicates, from the left, the example number, the formulation used, the volume of acid to be neutralized, the initial weight of the formulation prior to discharge (in lbs. -ozs.), the final weight of formulation actually discharged (in lbs. -ozs.), the percentage of formulation actually discharged, the initial pH and final pH of the formulation/acid mixture and observations concerning the test itself.

The percentage of formulation discharged indicates the ability of the formulation to be efficiently dispersed onto the spill. The differential in pH from the initial to the final readings indicates the ability of the formulation to neutralize the spill. Table I demonstrates that the formulations of this invention have excellent abilities to absorb and neutralize acid spills. They are also easy to disperse over a spill from a distance.

FORMULATIONS

| | |
|---|---|
| Formulation A: | 73.39 MgO (20 × 100) |
| | 10.00 CaO |
| | 5.00 $Na_2CO_3$ (dense) |
| | 5.21 $CaSiO_3$ |
| | 5.50 attaclay-coarse |
| | 0.50 Mg Stearate |
| Formulation B: | 73.79 MgO (20 × 100) |
| | 10.00 CaO |
| | 10.00 $Na_2CO_3$ dense |
| | 5.71 $CaSiO_3$ |
| | 0.50 Mg Stearate |
| Formulation C: | 65.00 MgO (20 × 100) |
| | 5.00 MgO (10–40) |
| | 15.26 CaO |
| | 5.00 $Na_2CO_3$-dense |
| | 4.00 attaclay-coarse |
| | 5.21 $CaSiO_3$ |
| | 0.50 Mg Stearate |
| Formulation D: | 62.50 MgO (20 × 100) |
| | 10.00 Mg Chem (10–49) |
| | 10.26 CaO |
| | 5.00 $Na_2CO_3$-dense |
| | 4.03 attaclay-coarse |
| | 7.71 $CaSiO_3$ |
| | 0.50 Mg Stearate |
| Formulation E: | 73.79 MgO (20 × 100) |
| | 10.00 CaO |
| | 5.00 $Na_2CO_3$-dense |
| | 5.50 attaclay |
| | 5.21 $CaSiO_3$ |
| | 0.50 Mg Stearate |
| Formulation F: | 39.00 MgO (20 × 100) |
| | 39.00 MgO-(Fine Grade-100) |
| | 9.00 $Na_2CO_3$-dense |
| | 10.00 attaclay-coarse |
| | 3.00 Mg Stearate |
| Formulation G: | 79.00 MgO (20 × 100) |
| | 10.00 CaO |
| | 10.00 attaclay coarse |
| | 1.00 Tricalcium phosphate |
| Formulation H: | 39.00 MgO (20 × 100) |
| | 39.00 MgO (Fine Grade-100) |
| | 9.00 $Na_2CO_3$-dense |
| | 10.00 attaclay-coarse |
| | 3.00 Tricalcium phosphate |
| Formulation I: | 39.50 MgO (20 × 100) |
| | 39.50 MgO (Fine Grade-100) |
| | 10.00 CaO |
| | 5.00 $Na_2CO_3$-dense |
| | 5.50 attaclay-course |
| | 0.50 Mg Stearate |
| Formulation K: | 36.00 MgO (20 × 100) |
| | 36.00 MgO (Fine Grade-100) |
| | 20.00 $Na_2CO_3$-dense |
| | 5.00 Attaclay-coarse |
| | 3.00 Tricalcium phosphate |
| Formulation L: | 36.00 MgO (20 × 100) |
| | 36.00 MgO (Fine Grade-100) |
| | 5.00 CaO |
| | 10.00 $Na_2CO_3$-dense |
| | 10.00 attaclay-coarse |
| | 2.50 Tricalcium phosphate |
| | 0.50 Silanox |
| Formulation M: | 39.50 MgO (20 × 100) |
| | 39.50 MgO (Fine Grade-100) |
| | 8.00 CaO |
| | 5.00 $Na_2CO_3$-dense |
| | 5.00 attaclay-coarse |
| | 3.00 Tricalcium phosphate |
| | 0.50 Silanox |
| Formulation N: | 49.00 MgO (20 × 100) |
| | 29.00 MgO (Fine Grade-100) |
| | 9.00 $Na_2CO_3$-dense |
| | 10.00 attaclay-coarse |
| | 3.00 Magnesium Stearate |
| Formulation P: | 36.50 MgO (20 × 100) |
| | 36.50 MgO (Fine Grade-100) |
| | 5.00 CaO |
| | 9.00 $Na_2CO_3$-dense |
| | 12.50 attaclay-coarse |

|  |  |
|---|---|
| Formulation Q: | 0.50 Magnesium Stearate<br>36.50 MgO (20 × 100)<br>36.50 MgO (Fine Grade-100)<br>5.00 CaO<br>9.00 Na₂CO₃-dense<br>12.50 attaclay-coarse<br>0.50 Magnesium Stearate |
| Formulation Q: | 31.50 MgO (20 × 100)<br>31.50 MgO (Fine Grade-100)<br>4.00 CaO<br>7.50 Na₂CO₃-dense<br>25.00 attaclay-coarse<br>0.50 Magnesium Stearate |

| Example | Acid | Volume | Wt. Agent | Wt. Discharge | % Discharge | pH (i) | pH (f) | Observations |
|---|---|---|---|---|---|---|---|---|
| 1 A | H₂SO₄ | 2 gal. | 26–3 | 26–3 | 97.0 | 0.99 | 8.85 | Very hard |
| 2 A | H₂SO₄ | 2 gal. | 27–0 | 26–9 | 98.4 | 0.86 | 8.57 | Hard After agitation on 5 min from application |
| 3 B | H₂SO₄ | 2 gal. | 30–0 | 28–7 | 94.8 | 0.82 | 9.26 | Liquid left in pan, but absorbed after agitation |
| 4 C | H₂SO₄ | 2 gal. | 30–0 | 29–9 | 98.5 | 0.98 | 9.26 | Absorbed with stirring |
| 5 D | H₂SO₄ | 2 gal. | 22–14 | 21–12 | 95.1 | 0.31 | 8.34 | Good deal of liquid remaining |
| 6 A | H₂SO₄ | 2 gal. | 24–1 | 23–9 | 0 | 0.52 | 8.82 | good solid |
| 7 E | HCl | 2.5 gal. | 25.0 | 24–12 | 99.0 | 6.00 | 8.81 | semi-solid; hardness in 12 hrs; can be shoveled |
| 8 E | HCl | 2 gal. | 29–0 | 27–14 | 96.1 | 9.39 | 9.46 | Absorbed with agitation |
| 9 E | HCl | 2 gal. | 27–0 | 26–5 | 97.4 | 8.90 | 9.14 | Poor set |
| 10 F | H₂SO₄ | 2 gal. | 29–0 | 27–10 | 95.3 | 0.52 | 9.35 | Good |
| 11 E | H₂SO₄ | 2 gal. | 29–12 | 29–4 | 98.3 | 0.52 | 9.07 | Granular material |
| 12 E | H₃PO₄ | 2 gal. | 29–0 | 28–6 | 97.9 | 5.02 | 7.87 | Easy to pick up |
| 13 G | H₃PO₄ | 2 gal. | 30–0 | 28–4 | 94.2 | 4.79 | 5.59 | Some remaining liquid, upon mixing |
| 14 H | H₂SO₄ | 2 gal. | 28–0 | 26–11 | 95.3 | 1.57 | 9.36 | Poor absorption with good solid |
| 15 H | HCl | 2 gal. | 27–12 | 25-15 | 93.5 | 9.03 | 9.08 | Soupy, but hardens in 24 hrs. |
| 16 H | H₃PO₄ | 2 gal. | 28–8 | 27–4 | 95.6 | 4.96 | 6.74 | Good |
| 17 H | HNO₃ | 2 gal. | 28–0 | 26–4 | 93.8 | 9.16 | 9.37 | Good |
| 18 H | HCOOH | 2 gal. | 26–0 | 24–14 | 95.7 | 4.39 | 9.60 | Good |
| 19 H | CH₃COOH | 2 gal. | 28–0 | 26–10 | 95.1 | 5.84 | 9.32 | Good |
| 20 H | HClOP₄ | 2 gal. | 28–0 | 26–8 | 94.6 | 5.97 | 9.30 | Good |
| 21 I | H₂SO₄ | 2 gal. | 29–0 | 26–14 | 92.7 | 1.05 | 9.43 | Good |
| 22 H | HClO₄ | 2 gal. | 26–0 | 24–8 | 94.23 | 8.23 | 8.90 | Excellent |
| 23 I | HCl | 2 gal. | 30–0 | 28–16 | 95.4 | 9.08 | 9.11 | Absorbed in mixing |
| 24 I | H₃PO₄ | 2 gal. | 30–0 | 28–6 | 94.6 | 5.27 | 7.36 | Absorbed in |
| 25 I | HNO₃ | 2 gal. | 30–0 | 38–10 | 95.4 | 9.14 | 9.29 | Mild rxn; good solid |
| 26 I | CH₃COOH | 2 gal. | 30–0 | 28–6 | 94.6 | 9.62 | 9.72 | Very good absorption and reaction |
| 27 I | HCOOH | 2 gal. | 30–0 | 28–8 | 95.0 | 5.23 | 0.55 | Some post reaction when mixed |
| 28 I | HClO₄ | 2 gal. | 30–0 | 28–2 | 93.8 | 8.48 | 9.06 | Very good absorption |
| 29 H | H₂SO₄ | 2 gal. | 28–0 | 20 | 71.4 | 0.06 | 8.76 | Poor |
| 30 H | H₂SO₄ | 2 gal. | 28–0 | 26–4 | 93.8 | 1.30 | 9.39 | Good |
| 31 H | HCl | 2 gal. | 28–0 | 26–0 | 92.9 | 9.05 | 9.17 | Soupy |
| 32 H | H₃PO₄ | 2 gal. | 28–0 | 26–8 | 94.6 | 5.06 | 8.83 | Good |
| 33 H | H₂SO₄ | 2 gal. | 26–8 | 26–0 | 96.2 | 1.35 | 1.19 | Good |
| 34 H | H₂SO₄ | 2 gal. | 28–0 | 26–7 | 94.4 | 1.01 | 9.47 | Good absorption; high reactivity |
| 35 H | HCl | 2 gal. | 28–0 | 25–8 | 91.1 | 8.81 | 9.18 | Good reaction |
| 36 H | H₃PO₄ | 2 gal. | 28–0 | 26–6 | 94.2 | 5.10 | 8.74 | Good absorption |

-continued

| Example | Acid | Volume | Wt. Agent | Wt. Discharge | % Discharge | pH (i) | pH (f) | Observations |
|---|---|---|---|---|---|---|---|---|
| 37 K | $H_2SO_4$ | 2 gal. | 28–0 | 26–2 | 93.3 | 1.10 | 9.30 | with mixing Good rxn characteristics |
| 38 K | $H_2SO_4$ | 2 gal. | 28–0 | 26–4 | 93.8 | 8.83 | 9.27 | Soupy |
| 39 K | $H_3PO_4$ | 2 gal. | 28–0 | 25–11 | 91.8 | 5.19 | 9.05 | Good |
| 40 H | $HNO_3$ | 2 gal. | 28–0 | 22–0 | 78.6 | 9.19 | 9.40 | Some remaining liquid |
| 41 H | $CH_3COOH$ | 2 gal. | 28–0 | 26–8 | 94.6 | 5.84 | 9.34 | Very fast rxn |
| 42 H | HCOOH | 2 gal. | 28–0 | 26–4 | 93.8 | 4.96 | 9.44 | All liquid absorbed |
| 43 H | $HClO_4$ | 2 gal. | 28–0 | 27–1 | 96.4 | 2.60 | 9.01 | Some remaining liquid |
| 44 L | $H_2SO_4$ | 2 gal. | 28–0 | 27–1 | 96.6 | 1.23 | 9.31 | Liquid left after discharge- silanox no good |
| 45 L | HCl | 2 gal. | 28–0 | 26–5 | 94.0 | 9.09 | 932 | Good rxn. and absorption 5 min. |
| 46 L | $H_3PO_4$ | 2 gal. | 28–0 | 26–16 | 95.1 | 5.13 | 7.69 | Mild rxn silanox hinders absorption |
| 47 I | $H_2SO_4$ | 2 gal. | 30–0 | 28–11 | 95.6 | 1.36 | 9.12 | Very mild rxn |
| 48 I | HCl | 2 gal. | 30–0 | 28–10 | 95.4 | 9.21 | 9.44 | Slow rxn. and absorption |
| 49 M | HCl | 2 gal. | 28–0 | 26–10 | 95.0 | 9.21 | 9.28 | Good rxn. characteristics |
| 50 N | $H_2SO_4$ | 2 gal. | 28–0 | 26–15 | 96.2 | 1.25 | 9.48 | Good |
| 51 N | HCl | 2 gal. | 28–0 | 26–7 | 94.4 | 8.90 | 8.97 | Soupy |
| 52 P | $H_2SO_4$ | 2 gal. | 30–0 | 28–13 | 96.0 | 1.26 | 9.59 | Faster rxn. then "N" |
| 53 P | HCl | 2 gal. | 30–0 | 28–10 | 95.4 | 9.29 | 9.41 | Good mild rxn. |
| 54 Q | $H_3PO_4$ | 2 gal. | 30–0 | 28–11 | 95.6 | 6.87 | 8.78 | Good absorption |
| 55 Q | $HNO_3$ | 2 gal. | 30–0 | 29–1 | 96.9 | 9.06 | 9.01 | Mild to moderate rxn. |
| 56 Q | $CH_3COOH$ | 2 gal. | 30–0 | 29–0 | 96.7 | 9.10 | 9.99 | Good absorption |
| 57 Q | HCOOH | 2 gal. | 30–0 | 28–7 | 94.8 | 4.51 | 9.49 | Mild |
| 58 Q | $HCLO_4$ | 2 gal. | 30–0 | 28–0 | 93.3 | 8.85 | 9.26 | Very good absorption- mild |
| 59 R | HCl | 2.5 gal. | 28–4 | 24–13 | 87.8 | 9.13 | 9.44 | Liquid remaining |

Sample sieve distributions for the various formulations are set forth in Table II. The distributions may vary slightly according to the particular example. The formulation is indicated at the left. The "Bulk" column indicates the median size of the particular. The "Sieve" columns indicate the size of the sieve used to measure the particle distribution.

| Formulation | Bulk | Sieve | | | | | |
|---|---|---|---|---|---|---|---|
| | | 20 | 40 | 100 | 200 | 335 | Pan |
| H | 105 | 1.5 | 30.6 | 51.6 | 10.9 | 3.6 | 1.9 |
| I | 99 | 1.4 | 26.9 | 45.6 | 8.8 | 3.0 | 13.9 |
| M | 106 | trace | 23.4 | 45.0 | 11.5 | 10.4 | 9.4 |

What is claimed is:

1. An article of manufacture for neutralizing and solidifying hazardous acidic spills comprising a device capable of dispensing a dry fluidized composition in a collimated directable steam, the composition consisting of about 1% to 84% by weight alkaline earth oxide, about 0% to 30% by weight alkali metal carbonate, about 0% to 10% by weight highly absorptive silica or clay, about 5% to 30% by weight absorptive clay having a lower rate of absorption relative to the highly absorptive silica or clay constituent, about 0.5% to 3% by weight hydrophobic lubricant agent and about 0% to 50% by weight portland cement, said composition having a particle size in the range of between about $-40$ and $+200$ Tyler screen mesh size.

2. An article of manufacture according to claim 1 wherein the composition consists of magnesium oxide, calcium oxide, sodium carbonate, attapulgas clay, calcium silicate and magnesium stearate.

3. An article of manufacture according to claim 1 wherein said alkaline earth oxide of the composition is magnesium oxide in coarse- and fine-grade forms.

4. An article of manufacture according to claim 1 wherein the composition consists of about 74% magnesium oxide, about 10% calcium oxide, about 5% sodium carbonate, about 5% calcium silicate, about 6.5% attapulgas clay and about 0.50% magnesium stearate.

5. An article of manufacture according to claim 1 wherein the composition consists of about 31 to about 39% coarse-grade MgO, about 31 to about 39% fine-grade MgO, between about 5 and about 9% sodium silicate, between about 5 and about 10% attapulqas clay and between about 1 and about 3 percent tricalcium phosphate.

6. An article of manufacture according to claim 1 wherein the composition consists about 31.5% coarse grade MgO, about 31.5% fine-grade MgO, about 4% CaO, about 7.5% $Na_2CO_3$, about 25% attapulgas clay and about 0.5% magnesium stearate.

7. A method of neutralizing and solidifying hazardous acidic spills utilizing a pressurized device comprising applying from said device a composition to the spill consisting of about 1% to 80% by weight alkaline earth oxide, 0 to 30% by weight alkali metal carbonate, about 0% to 10% by weight highly absorptive silica or clay, about 5% to 30% by weight less absorptive clay, about 0.5% to 2% by weight hydrophobic lubricant agent and 0% to 50% by weight portland cement to neutralize and solidify the acid spill, wherein said composition is in the form of dry particles having a size distribution between about −40 and +400 Tyler screen mesh size.

8. A method according to claim 7 wherein the device is a fire-extinguisher-like delivery device pressurized with nitrogen.

* * * * *

UNITED STATES PATENT AND TRADEMARK OFFICE
CERTIFICATE OF CORRECTION

PATENT NO. : 4,865,761  Page 1 of 2

DATED : September 12, 1989

INVENTOR(S) : Frederick S. Mandel, et al.

It is certified that error appears in the above-identified patent and that said Letters Patent is hereby corrected as shown below:

In the Specification

| | | |
|---|---|---|
| Column 1, | line 12 | : Delete "2" and insert therefor --1--. |
| Column 3, | line 50 | : Delete "s" between "so" and "to" and insert therefor --as--. |
| | line 63 | : Delete "conclude" and insert therefor --include--. |
| Column 4, | line 54 | : Insert --,-- after "e.g.". |
| Column 5, | line 15 | : Correct "still" to --spill--. |
| | line 24 | : Correct "on" to --in--. |
| | line 52 | : Correct "test"g" to --testing--. |
| Column 8, | line 2 | : Correct "Q" to --R--. |
| | Example 6A | : Delete "O" and insert therefor --97.9--. |
| | Example 11E | : Correct "grandular" to --granular--. |
| | Example 20H | : Correct "HClOP$_4$" to --HClO$_4$--. |
| | Example 24I | : Insert -- mixing-- after "absorbed in" at end of line. |
| Column 9, | line 64 | : Correct "steam" to --stream--. |

UNITED STATES PATENT AND TRADEMARK OFFICE
CERTIFICATE OF CORRECTION

PATENT NO. : 4,865,761

DATED : September 12, 1989

INVENTOR(S) : Federick S. Mandel, et al.

It is certified that error appears in the above-identified patent and that said Letters Patent is hereby corrected as shown below:

In the Specification

Column 10, Example 45L : Correct "932 to --9.32--.

line 46 : Correct "lower" to --slower--.

line 68 : Correct "attapulqas" to --attapulgas--.

In the Claims

Claim 6, line 4 : Insert --of-- between "consists" and "about".

Claim 7, line 12 : Correct "+400" to --+200--.

Signed and Sealed this

Twenty-eighth Day of August, 1990

Attest:

HARRY F. MANBECK, JR.

Attesting Officer      Commissioner of Patents and Trademarks